United States Patent [19]  [11] 4,224,432
Pechhold et al. [45] Sep. 23, 1980

[54] POLYURETHANES PREPARED WITH TETRAHYDROFURAN-ALKYLENE OXIDE POLYMERIZATES HAVING LOW OLIGOMERIC CYCLIC ETHER CONTENT

[75] Inventors: Engelbert Pechhold, Chadds Ford, Pa.; Ivan M. Robinson, Wilmington, Del.

[73] Assignee: E. I. Du Pont de Nemours and Company, Wilmington, Del.

[21] Appl. No.: 966,602

[22] Filed: Dec. 11, 1978

Related U.S. Application Data

[63] Continuation-in-part of Ser. No. 915,191, Jun. 13, 1978, abandoned.

[51] Int. Cl.³ .............................................. C08G 18/48
[52] U.S. Cl. ......................................... 528/76; 528/78
[58] Field of Search ..................................... 528/76, 77

[56] References Cited

U.S. PATENT DOCUMENTS

| 3,425,999 | 2/1969 | Axelrood et al. ..................... 260/615 |
| 4,071,492 | 1/1978 | Bethea et al. ..................... 260/31.8 R |

*Primary Examiner*—Maurice I. Welsh

[57] ABSTRACT

The resistance to degradation on exposure to high temperatures, water and organic liquids of a polyurethane prepared by reacting a tetrahydrofuran/alkylene oxide polymerizate, an organic polyisocyanate and a chain extender is significantly improved by using a tetrahydrofuran/alkylene oxide polymerizate which contains no more than about 3%, by weight, of oligomeric cyclic ethers.

10 Claims, No Drawings

POLYURETHANES PREPARED WITH TETRAHYDROFURAN-ALKYLENE OXIDE POLYMERIZATES HAVING LOW OLIGOMERIC CYCLIC ETHER CONTENT

CROSS REFERENCE TO RELATED APPLICATION

This application is a continuation-in-part of application Ser. No. 915,191, filed June 13, 1978, now abandoned.

DESCRIPTION

1. Technical Field

This invention relates to polyurethanes which are reaction products of (1) a polymerizate of tetrahydrofuran (THF) and an alkylene oxide (AO), (2) an organic polyisocyanate and (3) an aliphatic polyol or a polyamine chain extender. It is more particularly directed to such polyurethanes prepared with THF/AO polymerizates which contain no more than about 3%, by weight, of oligomeric cyclic ethers.

2. Background Art

THF/AO polymerizates are known and have been used in the preparation of polyurethanes, as shown, for example, in U.S. Pat. No. 3,425,999 to Axelrood and Lajiness and U.S. Pat. No. 4,071,492 to Bethea and Futamura. The polymerizates shown in these patents contain as much as 7-10%, by weight, of oligomeric cyclic ether byproducts. When such polymerizates are used in preparing polyurethanes, the presence of the cyclic ether byproducts tends to degrade the polyurethane's properties. This degradation manifests itself in much the same way as that encountered when an excess of plasticizer is used: the lower molecular weight cyclic ethers vaporize slowly at elevated temperatures and are leached out by water and common organic liquids, which results in weight loss and undesirable dimensional changes.

These undesirable effects are at a minimum in the polyurethanes of the invention, which are prepared with THF/AO polymerizates which contain no more than about 3%, by weight, of oligomeric cyclic ethers.

DISCLOSURE OF THE INVENTION

The THF/AO copolymers in the polymerizates used to prepare the polyurethanes of the invention contain 2-70%, by weight, of AO units, preferably 30-50%. The copolymers have number average molecular weights of 500-5000, preferably 650-2000, and have hydroxyl functionalities of 2.0-4.0, preferably 2.0. Mixtures of such polymerizates can also be used.

Number average molecular weight is determined by first determining the hydroxyl number of the copolymer by titration with acetic anhydride according to ASTM-D-1638 and then converting this number to number average molecular weight according to the formula $$\text{Molecular weight} = \frac{56,100 \times n}{\text{hydroxyl number}}$$

where n is the hydroxyl functionality of the copolymer.

The THF/AO polymerizate used to prepare the polyurethanes of the invention can be made by reducing the oligomeric cyclic ether content of a conventional THF/AO polymerizate by bringing the polymerizate into contact with a cationic exchange resin. The resin can be any acidic cationic ion exchange resin bearing —SO$_3$H groups and insoluble in the reaction medium in which it is being used. "Insoluble" means that the amount of resin which dissolves in the medium under process conditions will give the treated polymerizate an acid number of no greater than 0.05 mg of KOH per gram.

The nature of the "backbone" of the resin is unimportant. The most common commercially available resins of this type have backbones which are crosslinked copolymers of styrene and divinyl benzene, but resins having other backbones can be used. Preferred among the styrene/divinyl benzene resins, and preferred for use in practicing the invention, is one sold by the Rohm & Haas Company of Philadelphia, Pa., as Amberlyst ® 15. This macroreticular resin has an initial hydrogen ion concentration of about 4.9 milliequivalents per gram (dry), an initial surface area of about 40–50 square meters per gram, an initial porosity of 0.3–0.35 milliliter of pore per milliliter of bead, and an initial average pore diameter of 200–600 Angstrom units. These values tend to change somewhat as the resin is used.

Illustrative of an ion exchange resin having a backbone other than a crosslinked copolymer of styrene and divinyl benzene is one sold by E. I. du Pont de Nemours and Company as Nafion ® perfluorosulfonic acid resin. This resin is a copolymer of tetrafluoroethylene and a monomer represented by the structure

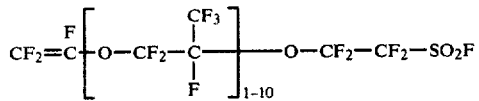

These copolymers are prepared in the sulfonyl fluoride form and are then hydrolyzed to the acid form, as described in U.S. Pat. No. 3,692,569.

The ion exchange resins having styrene/divinyl benzene copolymer backbones are preferably pretreated before use as follows:

1. The resin is placed in a column, backwashed with water, allowed to settle and then drained.
2. Two bed-volumes of 2 N HCl are run through the resin over a twenty-minute period.
3. The acid is washed from the resin with five bed-volumes of water. At the end of the cycle, water is drained from the resin until a 2.5 cm head remains at the top level of the bed.
4. Two bed-volumes of 1.5 N NaOH are run through the resin over a twenty-minute period.
5. The base is washed from the resin with five bed-volumes of deionized water. At the end of the cycle, water is drained from the resin until a 2.5 cm head remains at the top level of the bed.
6. Steps 1 and 2 are repeated.
7. The resin is washed with boiling water for one-half hour. Two bed-volumes of a 1:1 (volume) mixture of methanol and water are then run through the bed.
8. The resin is dried.

Once pretreated, and with periodic regeneration according to well-known methods, the resin can be used indefinitely, although long use may cause attrition of the resin or color formation and make its use impractical. The use of fresh catalyst is therefore preferred.

The process of preparing the polymerizate is begun by adding to a raw THF/AO polymerizate 0.5-25%, preferably 3–7%, by weight of the polymerizate, of the ion exchange resin. The resulting reaction mass is continuously agitated and brought to a temperature of 60°–150° C., preferably 90°–110° C., and held there, preferably under a vacuum of 13.3 kilopascals (100 mm of Hg) or less, with agitation, until its oligomeric cyclic ether content has been brought down to the desired level.

The time required to reach the desired oligomeric cyclic ether level varies with the original cyclic ether content of the polymerizate and the temperature at which the process is conducted, but normally that level will be reached in 1–4 hours, the higher process temperatures favoring shorter times.

When the process of preparing the THF/AO polymerizate is run at the preferred temperatures, THF, water and various byproducts are given off from the reaction mass. These substances can be withdrawn from the reaction zone by sweeping it with an inert gas such as nitrogen or by running the process under vacuum. The process can be run batchwise or in a continuous fashion. When run continuously, the process is preferably run in stages to avoid the adverse effects of backmixing, as is well known in the art. In the continuous mode, the ion exchange resin is held in the reaction zone by suitable filters or screens. When the process is run batchwise, the liquid product is removed from the reaction vessel, preferably by decantation, leaving the resin behind. The vessel can then be refilled and a new reaction begun, using the original resin.

The THF/AO polymerizates used according to the invention can also be prepared by subjecting such polymerizates having high oligomeric cyclic ether content to molecular distillation, using conventional techniques, or by extracting the ethers from the polymerizates with water.

The THF/AO polymerizates made according to the aforementioned methods contain no more than about 3%, by weight, of oligomeric cyclic ethers, preferably no more than about 2%, even more preferably no more than about 1%.

"Alkylene oxide", as used herein, means an alkylene oxide containing 2 or 3 carbon atoms in its ring. The AO can be unsubstituted or substituted with, for example, alkyl groups, aryl groups or halogen atoms. Illustrative of such alkylene oxides are ethylene oxide (EO), 1,2-propylene oxide (PO), 1,3-propylene oxide, 2,2-bis-chloromethyl-1,3-propylene oxide, epichlorohydrin and styrene oxide. The polymerizates preferred for use in preparing the polyurethanes of the invention are the THF/ethylene oxide polymerizates and the THF/1,2-propylene oxide polymerizates, especially those containing 30–50%, by weight, of ethylene oxide or propylene oxide units.

"Oligomeric cyclic ether", as used herein, means a compound having a calculated molecular weight of no more than about 500 and containing two or more of the following units linked together in a ring:

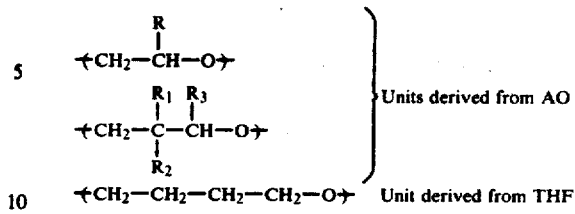

where $R$, $R_1$, $R_2$ and $R_3$ are hydrogen, methyl, ethyl or halomethyl.

Illustrative of such oligomeric cyclic ethers are those represented in the following table:

| Composition - Number Ratio of AO Units to THF Units | |
|---|---|
| 2:1 | 1:4 |
| 1:2 | 3:3 |
| 3:1 | 5:2 |
| 2:2 | 2:4 |
| 4:1 | 4:3 |
| 1:3 | 6:2 |
| 3:2 | 3:4 |
| 5:1 | 5:3 |
| 2:3 | 2:5 |
| 4:2 | 4:4 |

Oligomeric cyclic ether (OCE) content is determined by programmed gas chromatography, using a stainless steel column having a length of 3.049 meters (10 feet) and an outside diameter of 3.175 mm (⅛ inch), packed with 5% by weight of "OV-101", a methyl silicone oil sold by Supelco, Inc., supported on 100–120 U.S.S. mesh "Chromsorb G", sold by Hewlett-Packard, Inc. The column is in an oven whose temperature is programmed to rise from 70°–300° C. at the rate of 30° C. per minute, with a 12 minute hold time at 300° C. before the cycle is repeated, and has a glass liner for the injection port, which liner must be replaced frequently to prevent contamination of the port with nonvolatile fractions of sample. The instrument may be equipped with an integrator to determine the concentration of unknown in the sample. The determination is conducted under the following conditions:

| | |
|---|---|
| Injection port temperature | 280° C. |
| Thermal conductivity detector setting | 320° C. @ 150 milliamperes |
| Carrier gas @ gas flow | Helium @ 30 cubic centimeters per minute |
| Sample size | 10 microliters |
| Internal Standard | Dimethyl ether of triethylene glycol |

The procedure is standardized by first preparing three standard solutions containing, respectively, 2%, 5% and 10% by weight of purified OCE in tetrahydrofuran. A sample of each standard solution is then prepared by measuring into a sample bottle 1.00 gram of the standard solution, 0.10 gram of the dimethyl ether of triethylene glycol and 10 ml of reagent grade toluene, and then shaking the bottle. Duplicates of each sample are injected in turn into the chromatograph, which is then run under the previously mentioned conditions.

The response factor (RF) of the determination is then calculated for each sample according to the equation $$RF = \frac{(\% \text{ OCE in standard}) (\text{area \% of internal standard}) \times (\text{weight of standard solution})}{(\text{area \% of OCE})(\text{weight of internal standard})(100)}$$

Average response factor, $RF_a$, is found by averaging the six response factors thus calculated.

The determination of OCE content is carried out by first preparing a sample of THF/alkylene oxide polymerizate of unknown OCE content by measuring into a sample bottle 1.00 gram of solvent-free polymerizate, 0.10 gram of internal standard and 10 ml of reagent grade toluene, and then shaking the bottle. The sample is then injected into the chromatograph which is then run under the previously mentioned conditions. OCE content is calculated from the results according to the equation $$\text{Weight percent of OCE} = \frac{\text{area \% of OCE}}{\text{area \% of internal standard}} \times 10 \, RF_a$$

Purified OCE is obtained by first distilling a raw THF/alkylene oxide polymerizate (the alkylene oxide being the same as that in the copolymer of the unknown) in a 5.08 cm (2-inch) Pope wiped film molecular still, sold by Pope Scientific, Inc., Menomonee Falls, Wis. The distillation is carried out at 170°–190° C. and a pressure of less than about 26 Pa (0.2 mm of mercury), with an input rate of about 1 drop per second.

Two hundred parts by weight of the distillate are mixed with 60 parts by weight of 2,4-toluene diisocyanate and 3 drops of dibutyltin dilaurate and the mixture held at ambient temperature, with stirring, until the exothermic reaction subsides. The mixture is then held at 100° C. for two hours, with stirring, and its free isocyanate content determined by titration with di-n-butylamine, as described in Analytical Chemistry of the Polyurethanes, Volume XVI, Part III, D. J. David and R. B. Staley, Wiley-Interscience, 1969, pages 357–359. Enough ethylene glycol to give an isocyanate/hydroxyl mole ratio of about 1/1 is added to the mixture, which is then brought to 100° C. and held there for two hours, with stirring, to complete conversion to a polyurethane.

The resulting mixture containing the inert OCE is then extracted with diethyl ether and the extract concentrated on a rotary evaporater at 100° C. and a pressure of about 1333 Pa (10 mm of mercury). The concentrate is then distilled in the Pope molecular still at 170°–190° C. and a pressure of less than about 26 Pa (0.2 mm of mercury) and an input rate of about 1 drop per second. The distillate is purified OCE.

The polyisocyanate used in preparing a polyurethane of the invention can be any one of the aliphatic or aromatic polyisocyanates ordinarily used to prepare polyurethanes. Illustrative are
2,4-toluene diisocyanate
2,6-toluene diisocyanate
hexamethylene-1,6-diisocyanate
tetramethylene-1,4-diisocyanate
cyclohexane-1,4-diisocyanate
naphthalene-1,5-diisocyanate
diphenylmethane-4,4'-diisocyanate
xylylene diisocyanate
dicyclohexylmethane-4,4'-diisocyanate
1,4-benzene diisocyanate
3,3'-dimethoxy-4,4'-diphenyl diisocyanate
m-phenylene diisocyanate
isophorone diisocyanate
polymethylene polyphenyl isocyanate
4,4'-biphenylene diisocyanate.
4-isocyanatocyclohexyl-4'-isocyanatophenyl methane
p-isocyanatomethyl phenyl isocyanate Mixtures of isocyanates can also be used.

The isocyanates preferred for use because of the desirable properties they confer on the polyurethane products are diphenylmethane-4,4'-diisocyanate and the toluene diisocyanates.

The chain extender used in preparing a polyurethane of the invention can be any one of the aliphatic polyols, or any one of the aliphatic or aromatic polyamines ordinarily used to prepare polyurethanes.

Illustrative of the aliphatic polyols which can be used as chain extenders are
1,4-butanediol
ethylene glycol
1,6-hexanediol
glycerine
trimethylolpropane
pentaerythritol
1,4-cyclohexane dimethanol
phenyl diethanolamine Diols like hydroquinone bis($\beta$-hydroxyethyl)ether, tetrachlorohydroquinone-1,4-bis($\beta$-hydroxyethyl)ether and tetrachlorohydroquinone-1,4-bis($\beta$-hydroxyethyl)sulfide, even though they contain aromatic rings, are considered to be aliphatic polyols for purposes of the invention.

Aliphatic diols of 2–10 carbon atoms are preferred. Especially preferred is 1,4-butanediol. Mixtures of diols can also be used.

Illustrative of the polyamines which can be used as chain extenders are
p,p'-methylene dianiline and complexes thereof with alkali metal chlorides, bromides, iodides, nitrites and nitrates
4,4'-methylene bis(2-chloroaniline)
piperazine
2-methylpiperazine
oxydianiline
hydrazine
ethylenediamine
hexamethylenediamine
xylylenediamine
bis(p-aminocyclohexyl)methane
dimethyl ester of 4,4'-methylenedianthranilic acid
p-phenylenediamine
m-phenylenediamine
4,4'-methylene bis(2-methoxyaniline)
4,4'-methylene bis(N-methylaniline)
2,4-toluenediamine
2,6-toluenediamine
benzidine
dichlorobenzidine
3,3'-dimethylbenzidine
3,3'-dimethoxybenzidine
dianisidine
1,3-propanediol bis(p-aminobenzoate)
isophorone diamine The amines preferred for use are 4,4'-methylene bis(2-chloroaniline), 1,3-propanediol bis(p-aminobenzoate) and p,p'-methylenedianiline and complexes thereof with alkali metal chlorides, bromides, iodides, nitrites and nitrates. Mixtures of amines can also be used.

The polyurethanes of the invention are prepared in two steps, the first of which is conducted under nitrogen at ambient pressure to prevent oxidation of the reactants and product, and to prevent exposure of the reaction mass to atmospheric moisture. In the first step, the THF/AO polymerizate starting material is dried by heating it at a temperature of 80°–100° C. under vacuum, and is then heated to 60°–125° C., preferably about 70°–90° C., and held there while an excess over the stoichiometric amount, preferably twofold to tenfold, of organic diisocyanate is added, with stirring. The actual amount of isocyanate used depends on the molecular weight of the THF/AO polymerizate, as is well known in the art. The reaction mass is held for about 1–4 hours at 60°–125° C., with stirring, and the free isocyanate content of the mass is then determined by titration with di-n-butylamine, as described in Analytical Chemistry of the Polyurethanes, Volume XVI, Part III, D. J. David and H. B. Staley, Wiley-Interscience, 1969, pages 357–359.

In the second step, an amount of polyamine or polyol chain extender calculated to give an isocyanate/hydroxyl or amine mole ratio of about 0.9–1.1 to 1 in the reaction mass, preferably 1.05 to 1, is degassed at about 30°–120° C. and a pressure of 1333–6666 Pa and quickly added to the reaction mass.

The reaction mass is held with stirring at 60°–130° C. until it is homogeneous, which normally takes 1–5 minutes. The mass is then poured into molds, preferably preheated to 100°–120° C., and then cured at about 100°–120° C. at a pressure of 1,700–2,200 kilopascals for from 5 minutes to several hours. The casting is then cooled, removed from the mold, aged for about one week at ambient temperature, and is then ready for use.

The polyurethanes of this invention can also be made by reaction-injection and liquid-injection molding techniques, whereby the starting materials are simultaneously injected and mixed in a mold, preferably together with such a conventional polyurethane catalyst as dibutyltin dilaurate or stannous octoate, and then subjected to pressures ranging from ambient to several thousand kilopascals and temperatures ranging from ambient to 150° C. Use of a foaming agent such as a fluorocarbon or water is optional.

EXAMPLES

In the Examples, all parts and percentages are by weight.

Example 1 (Best Mode)

(A) The oligomeric cyclic ether content of a THF/EO polymerizate having an EO content of 42% was reduced to 0.75% by treatment with Amberlyst ® 15 resin. The number average molecular weight of the resulting polymerizate was 944. This polymerizate, 94.4 parts, was charged to a polymerization kettle and dried by heating it at 80° C. for 30 minutes at a pressure of 1300–2000 Pa.

The dried polymerizate was then heated to 80° C. and held at that temperature while 62.8 parts of melted, filtered diphenylmethane-4,4'-diisocyanate were quickly added thereto. The kettle was then purged with nitrogen and the reaction mass held at 80° C. for two hours, with stirring, to give a liquid product having a free isocyanate content of 8.12%, as determined by the di-n-butylamine titration technique.

This liquid product, 150 parts, was then heated at 80° C. for 30 minutes at a pressure of 1333 Pa (10 mm of Hg) to remove entrapped air.

(B) 1,4-Butanediol, 12.43 parts (which gave an isocyanate/hydroxyl mole ratio of 1.05/1), was heated to 70° C. and then quickly added, with rapid stirring, to the product of (A) held at 80° C. The reaction mixture was maintained at 80° C., with stirring, until it become homogeneous.

The mixture was poured into molds preheated to 110° C., which were then pressed in a platen press at 110° C. and a platen pressure of 2,155 kilopascals (312 psi) for 17 hours. The resulting elastomeric material was held for one week at ambient temperature and was then ready for use.

EXAMPLE 2

(A) The oligomeric cyclic ether content of a THF/EO polymerizate having an EO content of 36% was reduced to 1.1% by treatment with Amberlyst ® 15 resin. The number average molecular weight of the resulting polymerizate was 2603. This polymerizate, 130.1 parts, was charged to a polymerization kettle and dried by heating it at 80° C. for one hour at a pressure of 1300–2000 Pa.

The dried polymerizate was then held at 80° C. while 58.7 parts of melted, filtered diphenylmethane-4,4'-diisocyanate were quickly added thereto. The kettle was then purged with nitrogen and the reaction mass held at 80° C. for two hours, with stirring, to give a liquid product having a free isocyanate content of 8.1%, as determined by the di-n-butylamine titration technique. This liquid product, 150 parts, was then heated at 80° C. for 30 minutes at a pressure of 1333 Pa (10 mm of Hg) to remove entrapped air.

(B) 1,4-Butanediol, 12.4 parts (which gave an isocyanate/hydroxyl mole ratio of 1.05/1) was heated to 80° C. and then quickly added, with rapid stirring, to the product of (A) held at 80° C. The reaction mixture was maintained at 80° C., with stirring, until it became homogeneous.

The mixture was then poured into molds and cured as shown in Example 1.

Example 3

(A) The oligomeric cyclic ether content of a THF/EO polymerizate having an EO content of 37% was reduced to 2.2% by treatment with Amberlyst ® 15 resin. The number average molecular weight of the resulting polymerizate was 1099. This polymerizate, 109.9 parts, was charged to a polymerization kettle and dried by heating it at 80° C. for 30 minutes at a pressure of 1300–2000 Pa (10–15 mm of Hg).

The dried polymerizate was then heated to 110° C. and held at that temperature while 66.3 parts of melted, filtered diphenylmethane-4,4'-diisocyanate were quickly added thereto. The kettle was then purged with nitrogen and the reaction mass held at 110° C. for two hours, with stirring, to give a liquid product having a free isocyanate content of 7.84%, as determined by the di-n-butylamine titration technique.

This liquid product, 150 parts, was then heated at 110° C. for 30 minutes at a pressure of 1333 Pa (10 mm of Hg) to remove entrapped air.

(B) Hydroquinone bis($\beta$-hydroxyethyl)ether was dried by heating it at 115° C. for 30 minutes at a pressure of 1300–2000 Pa (10–15 mm of Hg). The ether was then heated to 115° C. and 26.4 parts thereof (which gave an isocyanate/hydroxyl mole ratio of 1.05/1) were quickly added, with rapid stirring, to the product of (A) held at 115° C. The reaction mixture was maintained at 115° C., with stirring, until it became homogeneous.

The mixture was then poured into molds and cured as shown in Example 1.

Example 4

(A) The oligomeric cyclic ether content of a THF/PO polymerizate having a PO content of 33% was reduced to 0.4% by passing it through a 5 cm wiped-film molecular still at a temperature of 195° C. and a pressure of about 67 Pa (0.5 mm of Hg). The resulting polymerizate had a number average molecular weight of 1220. This polymerizate, 109.9 parts, was charged to a polymerization kettle and dried by heating it at 80° C. for 30 minutes at a pressure of 1300-2000 Pa (10-15 mm of Hg).

The dried polymerizate was then heated to 80° C. and held at that temperature while 72.5 parts of melted, filtered diphenylmethane-4,4'-diisocyanate were quickly added thereto. The kettle was then purged with nitrogen and the reaction mass held at 80° C. for two hours, with stirring, to give a liquid product having a free isocyanate content of 7.92%, as determined by the di-n-butylamine titration technique.

This liquid product, 150 parts, was then heated at 80° C. for 30 minutes at a pressure of 1333 Pa (10 mm of Hg) to remove entrapped air.

(B) 1,4-Butanediol, 12.1 parts (which gave an isocyanate/hydroxyl mole ratio of 1.05/1), was heated to 70° C. and then quickly added, with rapid stirring, to the product of (A) held at 80° C. The reaction mixture was maintained at 80° C., with stirring, until it became homogeneous.

The mixture was then poured into molds and cured as shown in Example 1.

Example 5

(A) The oligomeric cyclic ether content of a THF/EO polymerizate having an EO content of 34% was reduced to 0.6% by passing it through a 5 cm wiped-film molecular still at a temperature of 175° C. and a pressure of 53 Pa (0.4 mm of Hg). The number average molecular weight of the resulting polymerizate was 1000. This polymerizate, 100 parts, was then charged to a polymerization kettle and dried by heating it at 80° C. for 30 minutes at a pressure of 1300-2000 Pa (10-15 mm of Hg).

The dried polymerizate was then heated to 125° C. and held at that temperature while 52.4 parts of dicyclohexylmethane-4,4'-diisocyanate were quickly added thereto. The kettle was then purged with nitrogen and the reaction mass held at 125° C. for four hours, with stirring, to give a liquid product having a free isocyanate content of 5.43%, as determined by the di-n-butylamine titration technique.

This liquid product, 140 parts, was then heated to 100° C. for 30 minutes at a pressure of 1333 Pa (10 mm of Hg) to remove entrapped air.

(B) p,p'-methylene dianiline, 17.9 parts (which gave an isocyanate/amine mole ratio of 1/1), was heated to 100° C. and then quickly added, with rapid stirring, to the product of (A) held at 100° C. The reaction mixture was maintained at 100° C., with stirring, until it became homogeneous.

The mixture was then poured into molds and cured as shown in Example 1.

INDUSTRIAL APPLICABILITY

The polyurethanes of the invention can be used in any application where polyurethanes of this general type are employed, but are of special benefit in fabricating articles which, in use, are exposed to high temperatures, water or organic liquids. They are of particular benefit in fabricating elastomers (especially tires), spandex fibers, flexible and rigid foams, coatings (both solvent-based and water-based) and adhesives.

We claim:

1. A polyurethane which is the reaction product of
   (A) a polymerizate of tetrahydrofuran and an alkylene oxide whose ring contains two or three carbon atoms, the polymerizate containing no more than about 3%, by weight, of oligomeric cyclic ethers;
   (B) an organic polyisocyanate; and,
   (C) a chain extender which is an aliphatic polyol or a polyamine.

2. The polyurethane of claim 1 wherein the polymerizate in (A) contains no more than about 1%, by weight, of oligomeric cyclic ethers.

3. The polyurethane of claim 1 wherein the polymerizate in (A) is of THF and ethylene oxide.

4. The polyurethane of claim 1 wherein the polyisocyanate in (B) is diphenylmethane-4,4'-diisocyanate or a toluene diisocyanate.

5. The polyurethane of claim 1 wherein the chain extender in (C) is 1,4-butanediol; p,p'-methylene dianiline and complexes thereof with alkali metal chlorides, bromides, iodides, nitrites and nitrates; 4,4'-methylene bis(2-chloroaniline) or 1,3-propanediol bis(p-aminobenzoate).

6. A polyurethane which is the reaction product of
   (A) a polymerizate of tetrahydrofuran and ethylene oxide, the polymerizate containing no more than about 1%, by weight, of oligomeric cyclic ethers;
   (B) diphenylmethane-4,4'-diisocyanate; and,
   (C) 1,4-butanediol.

7. In a process for preparing a polyurethane, the process comprising bringing together, under conditions suitable for reaction
   (A) a polymerizate of tetrahydrofuran and an alkylene oxide whose ring contains two or three carbon atoms;
   (B) an excess over the stoichiometric amount of an organic polyisocyanate; and,
   (C) an amount of an aliphatic polyol or a polyamine calculated to give an isocyanate/hydroxyl or amine mole ratio of about 0.9-1.1 to 1,
the improvement comprising use of a tetrahydrofuran/alkylene oxide polymerizate which contains no more than about 3%, by weight, of oligomeric cyclic ethers.

8. The process of claim 7 wherein reactants (A) and (B) are brought together first, and reactant (C) and the product of reactants (A) and (B) are then brought together.

9. An article cast from the polyurethane of claim 1.

10. A fiber spun from the polyurethane of claim 1.